United States Patent Office 3,504,977
Patented Apr. 7, 1970

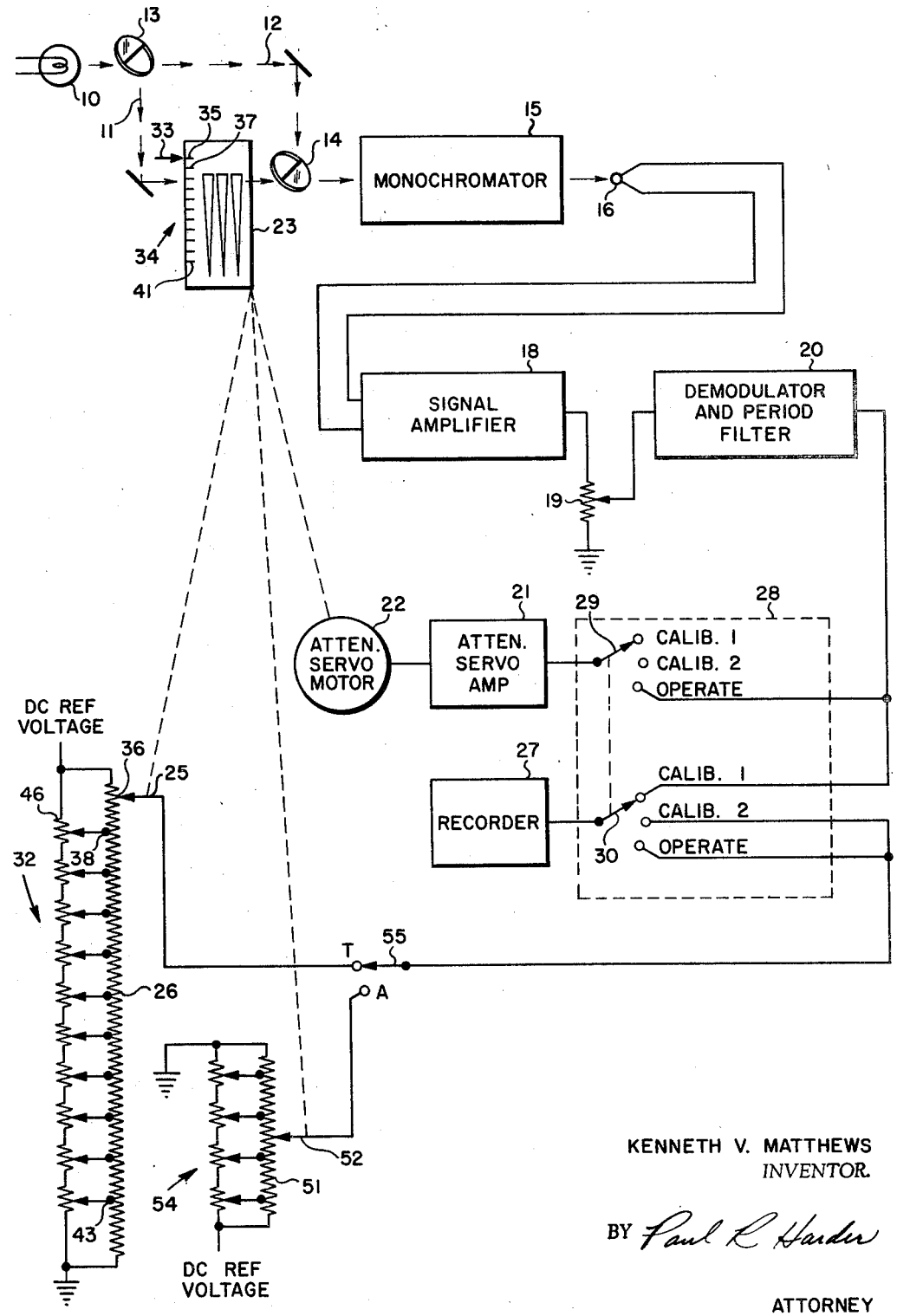

3,504,977
METHOD FOR CALIBRATING AND COMPENSATED OPTICAL NULL SPECTROPHOTOMETER
Kenneth V. Matthews, Garden Grove, Calif., assignor to Beckman Instruments, Inc. a corporation of California
Filed June 30, 1967, Ser. No. 650,412
Int. Cl. G01j 3/42
U.S. Cl. 356—89                                   6 Claims

ABSTRACT OF THE DISCLOSURE

Method and apparatus for calibrating the attenuator transmitting potentiometer such that attenuation is accurately indicated are disclosed. A standard double beam optical null spectrophotometer is modified by tapping the attenuator transmitting potentiometer at regular intervals. The taps are connected to associated low resistance trimmer potentiometers such that the potential at the tap may be adjusted to any desired value. A pair of mechanically coupled three-position mode switches are interposed such that in the first two positions the attenuator servo amplifier is disconnected and inoperative and in the third position is connected in the feedback loop in the normal double beam operating mode. In the first position the recorder is connected to the output of the detector and in the second two positions, to the transmitting potentiometer.

To calibrate the instrument, standard 100% calibration of the instrument in the single beam mode is made. The attenuator is then progressively moved into the beam in regular steps coresponding to the tapped positions on the transmitting potentiometer the single beam transmittance measured in the single beam with the mode switch in the first position, the mode switch moved to the second position and the trimmers adjusted to give the same recorder reading.

---

This invention relates to optical null spectrophotometers and more particularly to an improved compensated optical null spectrophotometer and method of calibrating therefor for the elimination of photometric errors in such analyzer due to optical attenuator imperfections, source inhomogeneity, optical aberrations and detector irregularities.

In the standard double beam optical null spectrophotometers it has been the practice in the past to utilize the reference beam optical attenuator position as an indication of the transmittance of the sample. The geometric position of the attenuator is a true indication of the sample transmittance only if the attenuator is perfectly linear, the source is perfectly homogeneous, the detector has no irregularities and no optical aberrations are created through the movement of the attenuator. It has been the practice to hold the attenuator to extremely close manufacturing tolerances, and to attempt to utilize a perfect source and detector and flawless optics. This approach is expensive and has typically resulted in instrument errors in the order of 1%.

The present invention allows a certain amount of relaxation in the previous rigid manufacturing requirements while improving the accuracy of the instrument substantially. The present invention provides method and means for accurately calibrating the geometrical position of the attenuator in such a manner that attenuator non-linearities, source inhomogeneity, optical aberrations and detector irregularities resulting from the attenuator are compensated.

A better understanding of the invention and an appreciation of the advantages thereof may be had by reference to the following detailed description when considered in connection with the accompanying drawing wherein there is illustrated in schematic form an improved optical null spectrophotometer constructed in accordance with the present invention.

Referring now to the drawing, radiation from source 10 is alternately directed along a reference beam bath 11 and a sample beam path 12 by rotating half mirror or beam splitter 13 and then recombined in a common, time-shared path by rotating half mirror or beam recombiner 14. Radiation passing the reference and sample beam paths is directed to a monochromator 15 where it is dispersed and a narrow bandwidth of wavelengths focused upon detector 16. Monochromator 15 may be of any suitable type with provision for scanning the spectrum past the exit slit such that the transmittance of the sample as a function of wavelength may be measured and recorded. Provision is made for the interposition of sample cells (not shown) in the reference and sample beam paths.

Detector 16 is connected to a signal amplifier 18 having its output connected through a gain control potentiometer 19 to a suitable demodulator and period filter network 20. As is well known, rotating half mirrors 13 and 14 and demodulator 20 are driven in synchronism such that the output of demodulator and period circuit 20 is a D.C. signal having an amplitude proportional to the difference in intensity of the radiation in the reference and sample beams and a polarity dependent upon which of these intensities is larger. It should be understood that some null spectrophotometers operate with an A.C. signal having an amplitude and phase indicative of the difference intensity and this invention may be utilized with such instrument with appropriate modification to adapt the system for operation with such signals.

In the standard optical null spectrophotometer the aforementioned D.C. signal is applied to the input of an attenuator servo amplifier 21 connected to an attenuator servo motor 22 which is mechanically coupled to attenuator 23 and operates to drive the attenuator into or out of the reference beam until the energy in the reference and sample beams is equal. Assuming perfect linearity of the system the position of the optical attenuator is an indication of sample transmittance. In the usual system the slider 25 of attenuator transmitting potentiometer 26, connected across any suitable stabilized D.C. source, is connected to the attenuator or the servo motor and driven synchronously therewith. Slider 25 is normally connected to the input of any suitable recorder 27 in such a manner that the recorder provides a continuous record of the position of attenuator 23. By driving the recorder chart in synchronism with the wavelength scan drive of the monochromator a continuous record of sample transmittance as a function of wavelength is obtained.

The improved optical null spectrophotometer of the present invention differs from the standard system by the inclusion of a three-position mode switch, the taps on the attenuator transmitting potentiometer and the trimmer potentiometers connected to these taps.

Mode switch 28 has a pair of armatures 29 and 30 mechanically coupled and positionable to three corresponding contacts indicated as Calibrate 1, Calibrate 2 and Operate. In the Calibrate 1 and 2 modes the servo feedback loop is broken by disconnecting the input to servo amplifier 21 thereby rendering servo motor 22 inoperative. The output of demodulator 20 is connected to recorder 27 through armature 30 in the Calibrate 1 mode and to the slider 25 of transmitting attenuator potentiometer 26 in the Calibrate 2 and Operate modes. In the Operate mode the output of demodulator and filter network 20 is connected to the input of attenuator servo amplifier 21 to complete the optical null feedback loop and provide standard double beam operation. It will be appreciated that separately operated switches may be utilized in place of the mechanically coupled armatures of mode switch 28.

Attenuator transmitting potentiometer 26 is normally of a relatively high resistance and according to the present invention is provided with a plurality of taps connected respectively to the sliders of trimmer potentiometers 32. The trimmer potentiometers, in the preferred embodiment illustrated, are connected in series circuit relationship across the stabilized D.C. reference voltage in parallel with the transmitting potentiometer 26. It should be understood that these trimmer potentiometers may be connected in parallel, one with the other, so long as the required potential span is encompassed consistent with good adjustability. These trimmers are utilized to modify the voltage at the taps in order to tailor the function of the transmitting potentiometer to the actual transmittance of the comb at selected positions.

A fixed index mark or pointer 33 is positioned adjacent the attenuator 23 which has thereon a plurality of index marks 34, the first corresponding to the 100% transmittance position and each of the other marks corresponding respectively to a tap on transmitting potentiometer 26. That is, when the comb is positioned such that index mark 35 is opposite pointer 33 slider 25 is located at the 100% transmittance position 36; when attenuator 23 moves such that mark 37 is adjacent pointer 33 slider 25 has moved to tap 38, etc. With the construction of the attenuator as indicated in the drawing, it will be appreciated that mark 35 represents the maximum transmittance position of the attenuator, i.e., 100% transmittance, and mark 41 represent zero transmittance. On potentiometer 26, position 36 represents the 100% transmittance position of attenuator 23 and tap 43 represents the zero transmittance position. The taps, and accordingly the indicia 34 on attenuator 23, are preferably spaced at regular intervals although this is not necessary so long as the respective indicia 34 corresponds to the position of the corresponding tap on potentiometer 26.

The advantages of the foregoing instrument may be best understood in connection with the method of calibration thereof which is now described. The mode switch is set in the Calibrate 2 position and the sample beam path blocked with an opaque object. The attenuator is manually set at its maximum transmittance position. In this position index mark 35 will be opposite indicator 33 and slider 25 will be located at position 36. In the Calibrate 2 mode of the recorder input is connected to slider 25 and the gain of recorder 27 is adjusted until the recorder reads full scale or 100% transmittance. The mode switch is then turned to the Calibrate 1 mode connecting the servo feedback loop to the recorder and the gain of the servo loop adjusted through gain control 19 until the recorder again reads 100%. These steps constitute standard 100% transmittance single beam calibration of the instrument.

The attenuator is then moved to the next adjacent index mark, mark 37, and slider 25 moves therewith to tap 38. The mode switch is placed in the Calibrate 1 position and the recorder reading noted. This reading then represents the actual attenuator transmittance at this position. The Calibrate 2 mode is then selected, connecting the recorder to slider 25 and the trimmer potentiometer 46 associated with tap 38 adjusted until the reading obtained is identical with the reading obtained in the Calibrate 1 mode. The signal from slider 25 now also represents the actual transmittance through the attenuator for this position. The attenuator is progressively moved to decrease the energy in the reference beam in the regular steps indicated by the marks 34 and pointer 33 and the trimmers associated with each of these positions are adjusted so that the recorder reading in the Calibrate 2 mode is identical to the recorder reading in the Calibrate 1 mode for each step.

It will be appreciated that the Calibrate 1 mode of switch 28 represents single beam operation of the system and, when the sample beam is blocked, the actual transmittance of the attenuator at that position. By adjusting the trimmer potentiometers at each of these positions the function of the transmitting potentiometer 26 is tailored to the actual detector signal for a given attenuator position. The output signal from the potentiometer 26 now represents actual attenuator transmittance rather than attenuator position as is the case in standard double beam optical null systems. It is obvious, therefore, that inaccuracies in the instrument due to nonlinearity of the attenuator, source inhomogeneity, optical aberrations and detector irregularities which result from the use of an optical attenuator are compensated. The accuracy attainable in this system is limited only by the number of taps and trimmer potentiometers used and the single beam accuracy of the instrument. The single beam accuracy is unaffected by the optical parameters which limit optical null accuracy. The single beam accuracy can be assured through the use of linear electronics and a stable source.

Functions other than sample transmittance are often obtained from attenuator transmitting potentiometers in spectrophotometers of this type. One such additional function is absorbance $$\left[a = \log \frac{1}{T}\right]$$

These functions are subject to the same random system errors as the transmittance potentiometer and may be compensated and calibrated in like manner. As illustrated in the drawing the spectrophotometer may include an absorbance transmitting potentiometer 51 having a slider 52 also connected for movement with attenuator 23. A series of taps and trimmer potentiometers 54 may be utilized in the same manner and calibration takes place by a like method, the above equation being used to convert the single beam transmission to absorbance. Selector switch 55 is provided for selecting either the transmittance or absorbance function.

Although it will generally be desirable, it is not necessary that initial adjustment of the recorder take place at the 100% transmittance value. For example, the attenuator could be set at the 50% transmittance index, the gain of the recorder adjusted to give a 50% reading in the Calibrate 1 position and the calibration carried out as previously set forth.

There has been illustrated and described preferred embodiments of the present invention given by way of example only. Obviously many modifications and variations are possible by those skilled in the art without departing from the scope of this invention.

What is claimed is:

1. In a double beam optical null spectrophotometer including a radiation detector, an attenuator feedback loop connected to said detector for positioning an attenuator in the reference beam in response to a detector signal indicative of a difference intensity in the reference and sample beam paths and a transmitting potentiometer providing a voltage signal that is a function of the position of said attenuator, the improvement comprising:
   means for disabling said attenuator feedback loop and selectively measuring the output of said detector and said transmitting potentiometer at selected positions of said attenuator; and
   variable voltage source means connected to said potentiometer for selectively controlling said voltage signal of said potentiometer at said selected positions of said attenuator.

2. In a double beam optical null spectrophotometer including a radiation detector, an attenuator feedback loop connected to said detector for positioning an optical attenuator in the reference beam path in response to a detector signal indicative of a difference intensity in the reference and sample beam paths to equalize the energy in said beam paths, a transmitting potentiometer having a slider movable with said attenuator and providing an electrical signal as a function of the position of said attenuator and a recorder responsive to said electrical signal for recording said signal as a function of wavelength, the improvement comprising:

means in said attenuator feedback loop for disabling said loop;

means connected to said feedback loop and to said recorder for selectively connecting the detector signal to said recorder;

means connected to said slider and to said recorder for selectively connecting said electrical signal to said recorder;

means connected to said potentiometer and to a voltage source for selectively controlling said electrical signal at selected points along said potentiometer.

3. The double beam optical null spectrophotometer according to claim 2 wherein:

said last named means comprises a plurality of trimmer potentiometers, each having its slider connected to one of a plurality of taps spaced along said transmitting potentiometer.

4. The double beam optical null spectrophotometer according to claim 3 wherein:

said first, second and third named means comprise a three-position mode switch having means for interrupting said feedback loop in first and second positions and completing said loop in a third position; means for connecting said feedback loop to said recorder in said first position; and means for connecting said transmitting potentiometer slider to said recorder in said second and third positions.

5. The method of calibrating an optical null spectrophotometer having an attenuator transmitting potentiometer and means for selectively adjusting the voltage at selected points along said potentiometer comprising the steps of:

disabling the attenuator servo loop;

measuring the reference beam intensity at selected positions of the optical attenuator corresponding to said selected points along said potentiometer;

adjusting the voltage at the selected points along said potentiometer to provide a signal corresponding to the intensity of the reference beam at each selected point.

6. The method of calibrating an optical null spectrophotometer having an attenuator, an attenuator transmitting potentiometer with a slider movable in synchronism with the optical attenuator, a plurality of taps along said potentiometer corresponding to selected positions of said optical attenuator, and a recorder conneced to record the transmission of said attenuator as a function of its position comprising the steps of:

disabling the attenuator servo loop;

positioning said attenuator for maximum transmittance;

connecting said recorder to said slider and adjusting the gain of said recorder to provide a recorder reading of 100%;

connecting the recorder to measure the reference beam intensity and adjusting the signal gain of said spectrophotometer to provide a reading of 100% for such intensity;

sequentially moving the attenuator to a position corresponding to one of said plurality of taps, connecting said recorder to measure the reference beam intensity at each position and connecting said recorder to said slider and adjusting the potential at the selected tap to provide a recorder reading corresponding to the reference beam intensity at such position.

References Cited

UNITED STATES PATENTS

| | | | |
|---|---|---|---|
| 2,803,799 | 8/1957 | Siegel et al. | 324—63 |
| 3,031,917 | 5/1962 | Pelavin | 356—181 |
| 3,063,043 | 11/1962 | Coates | 356—89 X |
| 3,377,555 | 4/1968 | Lewis | 324—63 |

RONALD L. WIBERT, Primary Examiner

FANNIE L. EVANS, Assistant Examiner

U.S. Cl. X.R.

250—204; 324—63; 356—95, 97